(No Model.)
W. R. BELL.
PUNCTURE CLOSER FOR PNEUMATIC TIRES.
No. 585,078. Patented June 22, 1897.
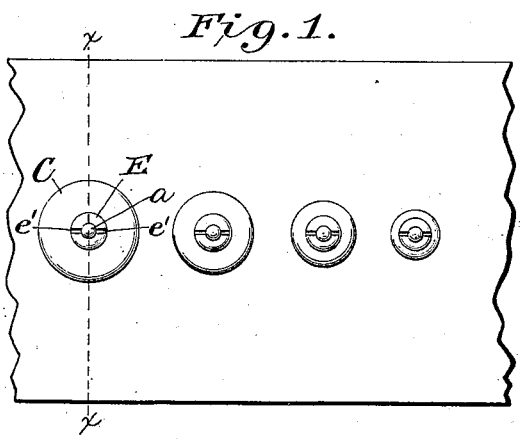
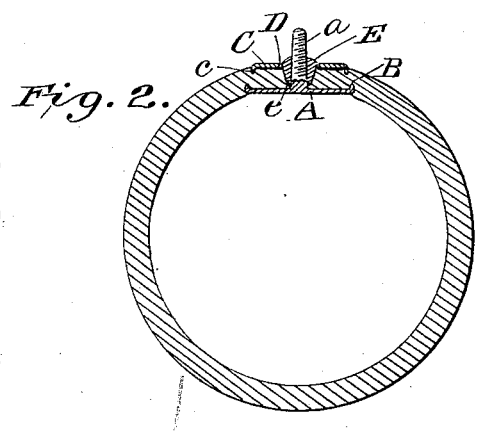
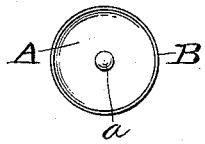
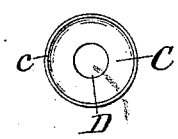
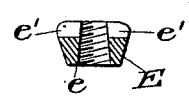
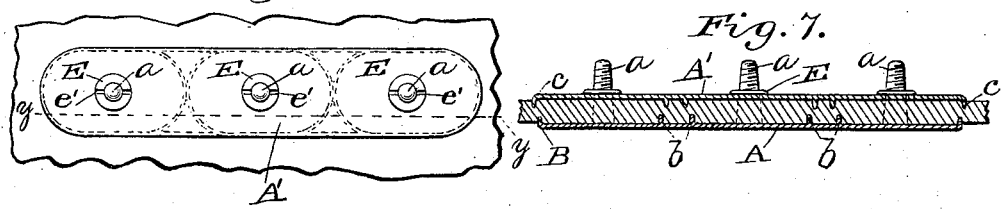
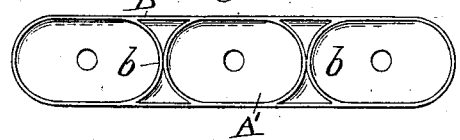
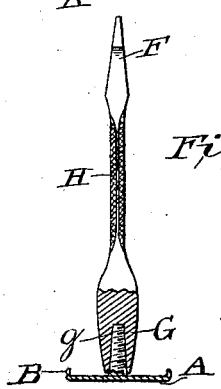
Witnesses
Jos. H. Blackwood
Alice W. Lister
Inventor
William Robert Bell
by Orlando B. Lester
Attorney

UNITED STATES PATENT OFFICE.

WILLIAM ROBERT BELL, OF DANBURY, CONNECTICUT, ASSIGNOR OF ONE-HALF TO SUSAN E. WILDMAN, OF SAME PLACE.

PUNCTURE-CLOSER FOR PNEUMATIC TIRES.

SPECIFICATION forming part of Letters Patent No. 585,078, dated June 22, 1897.

Application filed January 29, 1897. Serial No. 621,187. (No model.)

*To all whom it may concern:*

Be it known that I, WILLIAM ROBERT BELL, a subject of the Queen of Great Britain, residing at Danbury, in the county of Fairfield and State of Connecticut, have invented certain new and useful Improvements in Puncture-Closers for Pneumatic Tires, of which the following is a specification.

My invention relates to pneumatic tires and tubing, and more particularly to mechanical devices for closing punctures, ruptures, and breaks therein, and has for its object to provide a simple and effective device which may be quickly inserted in the puncture, rupture, or break in a pneumatic tire and secured therein by a person of intelligence who uses a vehicle provided with pneumatic tires, and which will effectually close such opening and render the tire serviceable.

Bicycle-riders are constantly subjected to the annoyance of punctured, ruptured, or cut tires, which renders their machine useless until the injury is repaired, and it very frequently happens that the puncture, rupture, or break in the tire occurs at a distance from the home of the rider or repair-shop and the rider is compelled to push his wheel back to his home or to the shop, owing to his lack of suitable means for closing the puncture, rupture, or cut.

Rubber plugs have been devised by which, with suitable tools for inserting them in a puncture and with a supply of rubber cement, a puncture in a single-tube tire may be temporarily patched, but with double tubes such devices are of little or no value. A rubber plug cannot, however, be used to effectually close a rupture or slit in either a single or double tube, and such injuries being common, both in city and country, the bicycle-rider when they occur becomes a victim of circumstances and what was intended as a pleasure-trip turns out to be a serious disappointment and a cause of fatigue and exposure, often resulting in sickness.

Truncated cones provided with a threaded aperture for receiving a screw have been devised, the cone being forced endwise through the puncture or opening, the base resting against the inner side of the tube and a washer resting against the outside thereof and the screw being passed through the aperture in the washer and through the puncture or opening and turned into the threaded aperture in the base of the cone. It is obvious that devices of this form tend to enlarge the puncture when inserted, and the base of the cone being unyielding the device will not conform in any degree whatever to the contour or curvature of the inflated tube.

Any device having a thick or cone-shaped head cannot be used in double tubes when the puncture, rupture, or opening does not extend through the walls of both tubes, unless the inner wall is cut or punctured to permit the head or cone to pass into the second tube. If placed between the walls of the inner and outer tubes, the head or cone will cut its way into the inner tube, or else the device will be torn out of the outer tube by the pressure of the inner tube against it. A device of this kind will not answer the purpose if the puncture is not completely closed or if for any reason the tire cannot be kept fully inflated. A material flattening of the tire from any cause will drive the point of the cone or the blunt end of a conical or thick head through the opposite wall of the tire at the point where the tire rests in contact with the rim of the wheel at every revolution of the wheel when the puncture-closer comes in contact with the surface on which it revolves.

Devices have been provided having a nut or head which is inserted in the tire through the puncture, the part which rests against the inner surface of the tube being concave, and the washer resting on the surface of the tire being also concave, the two members being drawn by a screw into contact with the respective surfaces. This construction grips the tire at the circumference of the washer and inner head or nut and leaves the walls of the tire within such area with little or no pressure thereon. Not only is there danger of the tire being cut entirely through at the circumference of the device, but the part adjacent to the screw, not being held in binding contact, may allow the air to escape between the side of the opening in the washer and the screw should there for any cause not be a complete contact of the part with the inner surface of the tire.

My invention is designed to obviate the objections to the devices for closing punctures here pointed out, and in so doing not only provide a device that will completely close a puncture, but will also effectually close ruptures, slits, and breaks.

An essential feature of my invention consists of a thin plate provided with a continuous flange projecting from one of its faces at a right angle and at or near the margin of its circumference, and a threaded stem or shank rigidly attached to the middle or center of the flanged side. This plate is inserted edgewise through the opening in the tire and with the stem or shank protruding therefrom and the flanged face resting against the interior surface. A correspondingly-flanged plate or washer is placed on the stem or shank with its flanged surface resting against the outer surface of the tire. The opening in the washer is flared from its inner to its outer surface to receive a conical nut, which, when screwed on the stem or shank, completely closes the flared opening in the washer and draws the inner head or plate and the washer into binding contact with the wall of the tire not only adjacent to the stem or shank, but at all points within the area of the head and washer, and more particularly within the area of the flanges, the latter biting or gripping the surfaces outside the edges of the puncture, rupture, or opening and preventing the torn part of the tires from being drawn apart.

I accomplish the objects of my invention in the manner and by the means hereinafter more fully described in detail and claimed, reference being made to the drawings accompanying this specification, and in which the same letters of reference indicate like parts in all the figures of the drawings, in which—

Figure 1 is a plan view of a section of a pneumatic tire, showing a series of washers, nuts, and ends of the shanks as they appear when used to close a puncture or rupture. Fig. 2 is a transverse vertical section on the line $xx$, Fig. 1. Fig. 3 is a bottom plan view of the plate; Fig. 4, a bottom plan view of the washer. Fig. 5 is an enlarged sectional view of the conical nut. Fig. 6 is a plan view of a number of flanged heads united in a single sheet and provided with stems or shanks. Fig. 7 is a longitudinal vertical section on line $yy$, Fig. 6; Fig. 8, a bottom plan view of a number of flanged heads united in a single sheet. Fig. 9 is a view of the key and wrench used to insert the head or plate in the puncture and turn the nut onto the shank. Fig. 10 is a side or edge view of the key screwed onto the shank, a part being cut away to show the flared interior of the key.

In carrying out my invention I provide a thin disk or oblong plate A, forming the head, with a short threaded stem or shank $a$, the threads thereon being continuous the entire length of the shank.

The shank $a$ may be formed integral with the disk or plate A which forms the head or it may be rigidly secured therein or attached thereto in any manner that will prevent the escape of air therethrough when secured in a punctured or ruptured pneumatic tire or tube. The diameter of the stem or shank $a$ is greatest at the face of the head, and it decreases very slightly but uniformly for a distance toward its end. The head may be circular and have the shank concentric thereon, or the head and washer may be oblong with circular ends. The oblong head is preferred for closing ruptures or slits, the length of the head being placed lengthwise of the rupture or slit; but this form may be used to close a simple puncture, the shape of the head permitting it to be readily inserted in the opening and then turned so the head will extend lengthwise therein should the puncture assume the form of a slit when the head is inserted. A well-defined flange B is formed on the margin of the face of the head A at its outer circumference and projects therefrom at a right angle, the edge of the flange not being thin or sharp enough to cut into the surface of the tube when drawn into contact therewith.

A washer C is provided which corresponds in shape to the head A and fits over the shank $a$ when the latter is in place in a puncture or rupture. The washer C is provided with a well-defined continuous flange $c$ on the circumference of its inner face, and it is also provided with an outwardly-flared aperture D, through which the shank $a$ passes. The diameter of the aperture, which is circular, is slightly greater than the diameter of the shank $a$ at its point of attachment to the head. A conical nut E, having the interior of its tapering end $e$ slightly flared to conform to the greater diameter of the shank $a$ at and near its point of attachment to the head, rests within the flared aperture D when all the parts are in place in a puncture or rupture. The diameter of the washer C is slightly less than the diameter of the head A to prevent the flanges from coinciding and cutting a hole in the wall of the tube. This construction permits the flanges on the head and washer to each bite or press into the surfaces of the tube and prevent it from being drawn away from the puncture or rupture, at the same time permitting the surfaces of the head and washer to press the wall of the tube and hold it rigidly between them. This compression of the wall of the tube begins before the nut E reaches the head A, and the edges of the puncture or rupture are forced against the shank $a$ and against each other along the line of the rupture before the tapering end of the nut reaches the face of the head. The tapering or conical nut E as it approaches the head A forces the wall of the tire in contact with the shank $a$ away from the shank and compresses it within the area of the flanges on said head and washer, the puncture or rupture being completely closed, thereby permitting the tire to be inflated to its greatest capacity without the edges of the puncture or rupture being drawn apart.

The head of the nut E is provided with two nicks $e'$ $e'$, which extend from the aperture therein to the circumference. These nicks $e'$ $e'$ receive the ends of a two-pronged wrench F, prongs $f$ $f$ of which rest on each side of the shank $a$. The nut may first be turned with the fingers and the wrench then used to complete the operation. The other end of the wrench consists of a cylindrical key G, which is provided with a threaded aperture $g$, slightly flared to conform to the shape of the shank $a$, onto which it is screwed to facilitate the insertion of the head into a puncture or rupture in the tire. The key or wrench is flat midway of its ends and is widened out and its sides H cross-cut and its edges single-cut to provide a file which may be used to cut off the end of the shank flush with the face of the nut when a pair of nippers are not at hand.

When the rupture or cut is too large for a disk or an elongated head with a correspondingly-shaped washer to be successfully used, a larger plate or head A', provided with two or more shanks $a$, is employed. These heads or plates A' are provided with a flange B, projecting from the margins of their face. Flanges $b$ extend around the face of the head at a distance from the shank and at a slightly less or at a greater distance on the face of the washer from the aperture therein which receives the shank $a$. This construction provides a means that successfully grips the tube at a distance outside the edges of the cut or rupture and also within the edges thereof and effectually closes such cut or rupture. The same conical-shaped nut and the flared aperture in the outer face of the washer or outer plate is provided and used with plate A'. A sheet containing a number of these multiple-shanked heads or plates may be provided and the number required to close a single cut or rupture separated therefrom with a pair of shears.

When it is desired to close a puncture or rupture in a pneumatic tire or tube, a disk or plate is selected of a diameter or dimension large enough to inclose or surround the puncture or rupture, allowing a slight margin between the edges of the puncture or rupture and the flange on the disk or plate, keeping in view the fact that the flanged washer is smaller than the disk or head. To close a puncture, screw the hollow end of the key or wrench onto the shank $a$ and against the head or as far as it will go. Then grasp the tube between the forefinger and thumb and compress it until the edges of the puncture or rupture separate or open slightly, and then insert the disk or plate edgewise in a manner similar to inserting a button in a buttonhole, the key being grasped as near the head as possible. Considerable pressure will be necessary to force the head through the opening if a disk or plate of sufficient diameter has been selected.

The wall of the tube will stretch or give enough to permit the use of a disk or head considerably larger than the puncture, cut, or rupture. When the head A, or A' when the latter device is used, is within the tube, or tubes if the tire is a double tube, the head is moved by means of the key until the shank is in the center of the puncture or in the middle of a rupture or cut, and then the key is used to draw the head against the face of the wall. To guard against the shank falling out of a cut or rupture when the key is removed, the tube may be flattened until the head rests against the opposite interior wall. The key is next unscrewed from the shank and the washer placed thereon and the nut screwed onto the shank, care being taken to force the washer and head into rigid contact with the surfaces of the tube. A small pair of nippers provided with cutting edges are next used to cut off the shank flush with the surface of the nut, or of the washer in case the nut should rest below the surface of the washer. A plate having more than one stem or shank may be inserted in a slit or rupture, the end and edge being inserted by the same movement far enough to permit the opposite end and edge to be forced into the slit or rupture.

My improved puncture and rupture closing device is intended for permanent use in closing a puncture, rupture, or cut. Under many conditions its permanent use will be preferable to repairs to punctures, ruptures, or cuts with rubber or other cement. The distance the washer rises from the surface of the tire is so slight that it offers no obstruction to the use of the tire, while the flat head will not injure the interior of the tube should the tire become flattened or suddenly deflated while riding the wheel, a contingency which would seriously injure a tire repaired with a conical or thick head.

The shanks, nuts, and apertures in the washers or outer plates are all respectively of the same size, and the same key may be used to apply any size to a punctured or ruptured tire.

Both the plate and washer may be slightly bent or curved to conform, in whole or in part, to the curvature of the tire when it is inflated.

The edge of the outer face of the washer and the edge of the inner head or plate opposite the flanged side is beveled or rounded. This form of the inner plate or head will prevent the edge from cutting the interior of the tire should the tire at any time become deflated in whole or in part.

Thin rubber washers may be interposed between the inner surface of the tire and the plate or head and between the outer surface of the tire and the washer, and a rubber sleeve may be fitted on the shank when used on tires of slight elasticity.

Having thus described my invention, what I claim as new, and desire to secure by Letters Patent, is—

1. A puncture-closer for pneumatic tires, consisting of a thin flanged head provided with a threaded shank to extend through the wall of the tire and through a washer provided with a flange, the aperture in said washer flared outwardly to receive a conical nut, provided with means to receive a tool for turning it, fitted thereto and to said shank to draw said head and said washer into binding contact with the surfaces of the walls of a tire, substantially as shown and described.

2. A puncture-closer for pneumatic tires, consisting of a head provided with a flange to rest against the interior surface of the tire and having a threaded shank to project through the puncture in said tire, a flanged washer to rest on the outer surface of the tire, the aperture in said washer flared outwardly to receive a conical nut, provided with means to receive a tool for turning it, fitted to said shank and to said aperture to draw said head and said washer into binding contact with the wall of said tire, said nut adapted to force said tire away from said shank and compress it within the area of the flanges on said head and washer, substantially as shown and described.

3. A device for closing punctures and slits in pneumatic tires, consisting of a thin plate having a continuous flange projecting from its face at the margin thereof and having a threaded shank attached to said face to project through said puncture or slit, a washer to rest on said shank having an outwardly-flared aperture and provided with a continuous flange on the margin of its face, a conical nut, provided with means to receive a tool for turning it, fitted to said shank and to said flared aperture with its tapering end adapted to force said tire out of contact with said shank when screwed thereon, substantially as shown and described.

4. A device for closing punctures and ruptures in pneumatic tires, consisting of a flanged head provided with a threaded shank tapering from its point of attachment to said head, said head adapted to rest against the interior surface of the tire with the shank projecting through the puncture or rupture therein, a flanged washer to rest on said shank, having the aperture therethrough flared outwardly, and a conical nut having means to receive a tool for turning it and provided with a flared aperture, fitted to said shank and to said flared aperture in said washer to force said tire out of contact with said shank and draw said head and said washer into binding contact with the surface of the tire, substantially as shown and described.

5. A device for closing punctures and breaks in pneumatic tires, consisting of a thin plate having a continuous flange on the margin of its face, a threaded shank rigidly attached to said face concentrically therewith, a thin washer provided with a continuous flange on the margin of its inner face and provided with an aperture concentrically therein to receive said shank, said aperture flared from its inner to its outer surface, a conical nut threaded to screw on said shank and tapered to rest in the flared aperture in said washer, said nut provided with nicks to receive a wrench to turn said nut and draw said washer and said plate in rigid contact with the surfaces of the walls of a pneumatic tire when inclosed therebetween, substantially as shown and described.

6. In a device for closing ruptures and slits in pneumatic tires, the combination with an oblong plate provided with a series of threaded shanks rigidly attached to said plate at a distance from each other thereon, said plate provided with a continuous flange on the margin of its face and with semicircular flanges across its face connecting with the flanges on its margins, of a plate provided with apertures therethrough corresponding in position with the position of said shanks on said plate, said apertures flared from the inner to the outer surface of said plate, and said plate having a continuous flange on the margin of its face and semicircular flanges transversely thereon connecting therewith, conical nuts provided with nicks to receive a wrench and apertured and threaded to fit on said shanks and in the flared apertures in said washers, substantially as shown and described.

In witness whereof I have hereunto affixed my signature.

WILLIAM ROBERT BELL.

Witnesses:
   BENJAMIN E. COWPERTHWAIT,
   A. G. ISING.